United States Patent [19]

Dalekotzin

[11] Patent Number: 5,515,396
[45] Date of Patent: May 7, 1996

[54] METHOD AND APPARATUS FOR SELECTING A SPREADING CODE IN A SPECTRUM SPREAD COMMUNICATION SYSTEM

[75] Inventor: Michael Dalekotzin, Buffalo Grove, Ill.

[73] Assignee: Motorola, Inc., Schaumburg, Ill.

[21] Appl. No.: 201,595

[22] Filed: Feb. 25, 1994

[51] Int. Cl.$^6$ .................................. H04B 1/707; H04B 1/69
[52] U.S. Cl. .......................... 375/206; 375/200; 375/205; 380/34; 370/19; 370/21; 370/22
[58] Field of Search ............................. 375/1, 200–210; 380/34; 370/18, 19, 21, 22

[56] References Cited

U.S. PATENT DOCUMENTS

| | | | |
|---|---|---|---|
| 4,559,633 | 12/1985 | Kan et al. ................................ | 375/1 |
| 4,597,087 | 6/1986 | Kadin .................................... | 375/1 |
| 4,606,041 | 8/1986 | Kadin .................................... | 375/1 |
| 4,612,652 | 9/1986 | Kadin .................................... | 375/1 |
| 4,930,140 | 5/1990 | Cripps et al. ........................... | 375/1 |
| 4,969,159 | 11/1990 | Belcher et al. ......................... | 375/1 |
| 5,123,986 | 7/1992 | Endo et al. ............................. | 375/1 |
| 5,204,876 | 4/1993 | Bruckert et al. ....................... | 375/1 |
| 5,235,614 | 8/1993 | Bruckert et al. ....................... | 375/1 |
| 5,278,864 | 1/1994 | Mori et al. ............................. | 375/1 |

*Primary Examiner*—Bernarr E. Gregory
*Attorney, Agent, or Firm*—Richard A. Sonnentag

[57] ABSTRACT

A communication system utilizes multiple spreading codes to transmit high data rate information. The system codes high data rate user information (201) and partitions the coded information (202) into blocks comprised of two bits, B1 and B2. Based on the representation of bits B1 and B2, the system chooses one of a possible four spreading codes ($W_1$ and $W_2$ and their phase reversals $W_1'$ and $W_2'$) to be utilized for transmission. Once received, the transmitted signal is input into correlators (306, 309) specific to each spreading code W1 and W2, and the maximum absolute value output from the correlators (306, 309) is determined. From this determination, the transmitted spreading code $W_1$, $W_2$, $W_1'$ or $W_2'$ is determined. The use of multiple spreading codes allows the for the transmission of high data rate information without altering the wireless air interface of the communication system.

26 Claims, 2 Drawing Sheets

200

300

METHOD AND APPARATUS FOR SELECTING A SPREADING CODE IN A SPECTRUM SPREAD COMMUNICATION SYSTEM

FIELD OF THE INVENTION

The invention relates generally to communication systems, and more particularly to utilizing multiple spreading codes in such communication systems.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the message signal into a form suitable for transmission over the channel. This processing of the message signal is referred to as modulation. The function of the channel is to provide a physical connection between the transmitter output and the receiver input. The function of the receiver is to process the received signal so as to produce an estimate of the original message signal. This processing of the received signal is referred to as demodulation.

Analog and digital transmission methods are used to transmit a message signal over a communication channel. The use of digital methods offers several operational advantages over analog methods, including but not limited to: increased immunity to channel noise and interference, flexible operation of the system, common format for the transmission of different kinds of message signals, improved security of communication through the use of encryption, and increased capacity.

To transmit a message signal (either analog or digital) over a communication channel having an assigned channel bandwidth, the message signal must be manipulated into a form suitable for efficient transmission over the channel. Modification of the message signal is achieved by means of a process termed modulation. This process involves varying some parameter of a carrier wave in accordance with the message signal in such a way that the spectrum of the modulated wave matches the assigned channel bandwidth. Parameters of a carrier wave that can be varied include amplitude, frequency, and or phase. Correspondingly, the receiver is required to recreate the original message signal from a degraded version of the transmitted signal after propagation through the channel. The re-creation is accomplished by using a process known as demodulation, which is the inverse of the modulation process used in the transmitter.

A spread spectrum system provides, among other things, robustness to jamming, good interference and multipath rejection, and inherently secure communications from eavesdroppers. In a spread spectrum system, a modulation technique is utilized in which a transmitted signal is spread over a wide frequency band within the communication channel. The frequency band is much wider than the minimum bandwidth required to transmit the information being sent. A voice signal, for example, can be sent with amplitude modulation (AM) in a bandwidth only twice that of the information itself. Other forms of modulation, such as low deviation frequency modulation (FM) or single sideband AM, also permit information to be transmitted in a bandwidth comparable to the bandwidth of the information itself.

However, in a spread spectrum system, the modulation of a signal to be transmitted often includes taking a baseband signal (e.g., a voice channel) with a bandwidth of only a few kilohertz, and distributing the signal to be transmitted over a frequency band that may be many megahertz wide. This is accomplished by modulating the signal to be transmitted with the information to be sent and with a wideband encoding signal (commonly known as a spreading code).

Thus, a spread spectrum system must have two properties: (1) the transmitted bandwidth should be much greater than the bandwidth or rate of the information being sent and (2) some function other than the information being sent is employed to determine the resulting modulated channel bandwidth.

The essence of the spread spectrum communication involves expanding the bandwidth of a signal, transmitting the expanded signal and recovering the desired signal by remapping the received spread spectrum into the original information bandwidth. Furthermore, in the process of carrying out this series of bandwidth trades, the purpose of spread spectrum techniques is to allow the system to deliver error-free information in a noisy signal environment.

With digital communication, user information such as speech is encoded into sequences of binary information. This encoding is convenient for modulation and is easily error-correction coded for transmission over a potentially degrading communication channel. Such binary information is particularly amenable to transmission using "direct sequence" spread spectrum modulation. With direct sequence, digital information is spread with a spreading code whose bit rate is much higher than the information signal itself. Although the spreading can be accomplished by several methods, the most common is to add each bit of information (generally after appropriate error correction coding) to a sequence of bits of the spreading code. Thus as desired for the spreading process, many bits are generated for each coded information bit that is desired to be transmitted.

Advantages from direct sequence spread spectrum communication systems are obtained since the receiver is knowledgeable of the spreading code used to spread the user signal. As is well known in the art the receiver, after appropriate synchronization to the receive signal, is able to decode the wide bandwidth spread signal using a replica of the spreading sequence. Another advantage of spread spectrum communication systems is the ability to provide multiple access capability. Specifically, cellular telephone communication systems have been designed to incorporate the characteristic of communicating with many remote units on the same communication channel.

One type of multiple access spread spectrum communication system utilized with direct sequence spread spectrum is a code division multiple access (CDMA) communication system. In a CDMA communication system, communication between two communication units is accomplished by spreading each transmitted signal over the frequency band of the communication channel with a unique user spreading code. As a result, transmitted signals are in the same frequency band of the communication channel and are separated only by unique user spreading codes. Particular transmitted signals are retrieved from the communication channel by despreading a signal representative of the sum of signals in the communication channel with a user spreading code related to the particular transmitted signal which is to be retrieved from the communication channel. Specially suited spreading codes may be employed to reduce the interference created by the sum of all the other signals present on the same channel. Orthogonal codes are typically used for this purpose, and of these, the Walsh codes are most common.

Many digital cellular telecommunication systems have the ability to provide reduced data rate traffic channels. These systems have traffic channels designed to operate a particular data rate and also have reduced data rate traffic channels which provide more traffic data capacity than that at the designed data rate. This increased traffic data capacity in achieved at the cost of reduced quality and/or increased complexity speech coders and decoders. However, in spread spectrum communication systems, and particularly CDMA communication systems, there is also a need to provide increased or high data rate traffic channels which allow for transmission of data at a rate higher than the designed data rate traffic channels. These increased data rates should be accomplished, however, transparently to current hardware designs and air-interface standards.

DETAILED DESCRIPTION OF A PREFERRED EMBODIMENT

Figure 1:
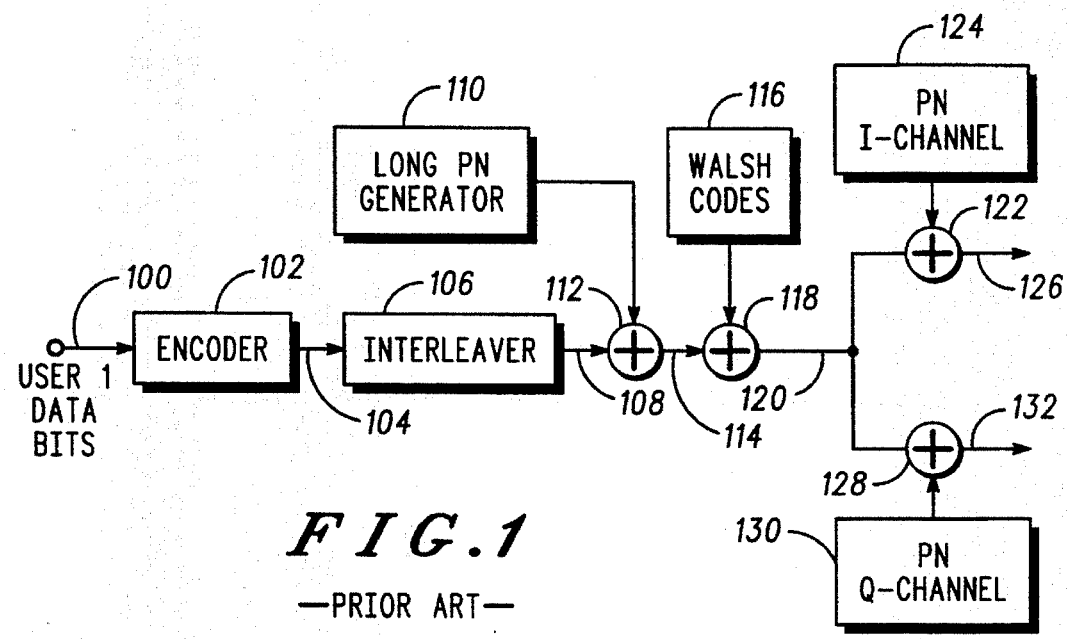
FIG. 1 generally depicts, in block diagram form, a prior art spread spectrum transmitter.

A communication system utilizes multiple spreading codes to transmit high data rate information. The system codes high data rate user information (201) and partitions the coded information (202) into blocks comprised of two bits, B1 and B2. Based on the representation of bits B1 and B2, the system chooses one of a possible four spreading codes ($W_1$ and $W_2$ and their phase reversals $W_1'$ and $W_2'$) to be utilized for transmission. Once received, the transmitted signal is input into correlators (306, 309) specific to each spreading code W1 and W2, and the maximum absolute value output from the correlators (306, 309) is determined. From this determination, the transmitted spreading code $W_1$, $W_2$, $W_1'$ or $W_2'$ is determined. The use of multiple spreading codes allows the for the transmission of high data rate information without altering the wireless air interface of the communication system.

As one of ordinary skill in the art will appreciate, many embodiments exist to implement multiple spreading usage in accordance with the invention. In the preferred embodiment, the spread spectrum communication system accepts information to be transmitted, via error correction coder/interleaver 227 and shift register 224, and selects, via multiplexer 203, a spreading code from a plurality of spreading codes based on the information. In the preferred embodiment, the selection is based on coded information, but alternate embodiments may base selection on the input user information before coding. Also in the preferred embodiment, the plurality of spreading codes are a plurality of Walsh codes which are orthogonal to one another.

Referring now to FIG. 1, a prior art spread spectrum transmitter is shown. In the prior art spread spectrum transmitter of FIG. 1, USER 1 data bits 100 are input to an encoder 102 at a particular bit rate (e.g., 9.6 kbps). USER 1 data bits 100 can include either voice converted to data by a vocoder, pure data, or a combination of the two types of data. Encoder 102 convolutionally encodes the USER i data bits 100 into data symbols at a fixed encoding rate. For example, encoder 102 encodes received data bits 100 at a fixed encoding rate of one data bit to two data symbols such that the encoder 102 outputs data symbols 104 at a 19.2 ksym/s rate.

The encoder 102 may accommodate the input of USER 1 data bits 100 at variable lower rates by encoding repetition. That is, when the data bit rate is slower than the particular bit rate at which the encoder 102 is designed to operate, encoder 102 repeats USER 1 data bits 100 such that the USER i data bits 100 are provided the encoding elements within the encoder 102 at the desired full rate. For example, if the input rate were ½ rate, the information would be repeated twice (i.e., to simulate a full rate). If the input rate were ¼ rate, the information would be repeated four times, and so on. Thus, the encoder 102 outputs data symbols 104 at a the same fixed rate regardless of the rate at which data bits 100 are input to the encoder 102.

The data symbols 104 are then input into an interleaver 106. Interleaver 106 interleaves the input data symbols 104. The interleaved data symbols 108 are output by the interleaver 106 at the same data symbol rate that they were input (e.g., 19.2 ksym/s) to one input of an exclusive-OR combiner 112.

A long pseudo-noise (PN) generator 110 is operatively coupled to the other input of exclusive-OR combiner 112 to enhance the security of the communication channel by scrambling data symbols 108. The long PN generator 110 uses a long PN sequence to generate a user specific sequence of symbols or unique user code at a fixed rate equal to the data symbol rate of the data symbols 108 input to exclusive-OR gate 112 (e.g., 19.2 ksym/s). The scrambled data symbols 114 are output from exclusive-OR combiner 112 at a fixed rate equal to the rate that data symbols 108 are input to the exclusive-OR combiner 112 (e.g., 19.2 ksym/s). Scrambled data symbols 114 are then input into exclusive-OR combiner 118.

A code division channel selection generator 116 provides a particular predetermined length spreading (Walsh) code to another input of exclusive-OR combiner 118. The code division channel selection generator 116 can provide one of 64 orthogonal codes corresponding to 64 Walsh codes from a 64 by 64 Hadamard matrix, wherein a Walsh code is a single row or column of the matrix. Exclusive-OR combiner 118 uses the particular Walsh code input by the code division channel generator 116 to spread the input scrambled data symbols 114 into Walsh code spread data symbols 120. The Walsh code spread data symbols 120 are output from exclusive-OR combiner 118 at a fixed chip rate (e.g., 1.2288 Mchips/s).

The Walsh code spread data symbols 120 are provided to an input of two exclusive-OR combiners 122 and 128. A pair of short PN sequences (i.e. short when compared to the long PN sequence used by the long PN generator 110) are generated by I-channel PN generator 124 and Q-channel PN generator 130. These PN generators 124 and 130 may generate the same or different short PN sequences. Exclusive-OR combiners 122 and 128 further spread the input Walsh code spread data 120 with the short PN sequences generated by the PN I-channel generator 124 and PN Q-channel generator 130, respectively. The resulting I-channel code spread sequence 126 and Q-channel code spread sequence 132 are used to bi-phase modulate a quadrature pair of sinusoids by driving the power level controls of a the pair of sinusoids. The sinusoid's output signals are summed, bandpass filtered, translated to an RF frequency, amplified, filtered and radiated by an antenna to complete transmission of USER I data bits 100 via a communication channel.

Figure 2:
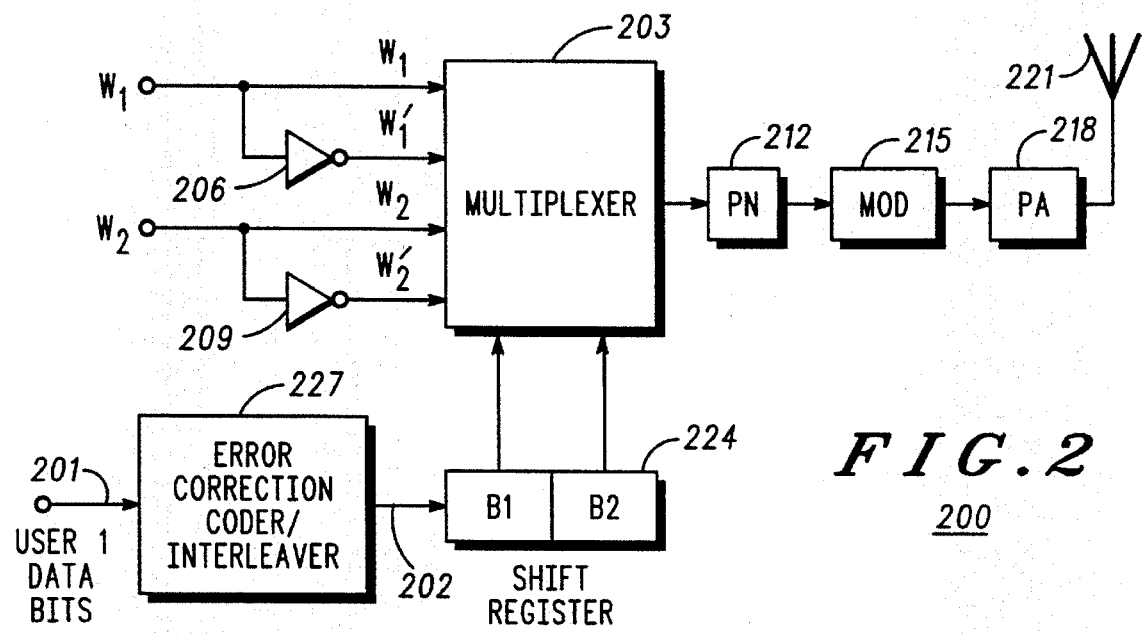
FIG. 2 generally depicts, in block diagram form, a spread spectrum transmitter which beneficially utilizes multiple spreading codes in accordance with the invention.

FIG. 2 generally depicts a preferred embodiment for transmitting user data at twice the rate of that shown in the prior art embodiment of FIG. 1. It should be noted that the characteristics of the signal ultimately transmitted in terms of chip rate, amplitude, spectrum, etc., are identical to the prior art technique as would be desired. Continuing, USER 1 data bits 201 enter error correction coder/interleaver 227 which provides coding and interleaving as in the prior art transmitter of FIG. 1. Important to note is that the USER i data bits 201 depicted in FIG. 2 are at twice the rate of the bits 100 of FIG. 1. The resulting bits 202 exiting error correction coder/interleaver 227, therefore, are at twice the rate as bits 108 exiting interleaver 106 of FIG. 1. The bits 202 exiting error correction coder/interleaver 227 are blocked into a two-bit word by shift register 224, and the bits are marked B1 and B2. The state of these two bits will determine the particular Walsh code and phase transmitted through the use of multiplexer 203. In this double rate example, to transmit twice the data rate requires the use of a second Walsh code, $W_2$, in addition to the first Walsh code, $W_1$.

A 4 to 1 multiplexer 203 has as inputs a first Walsh code, $W_1$, its phase reversal, $W_1'$, a second Walsh code, $W_2$, and its phase reversal $W_2'$. The particular Walsh code information transmitted is selected by the contents B1B2 of the shift register 224. For each two bits captured by shift register 224, a single 64 bit Walsh code/phase selection is made. To accommodate the double rate being input into error correction coder 227, a division by two occurs between the data rate input to multiplexer 203 and the data generated by PN spreader 212. Thus, as in the prior art example, a 1.2288 Mchp/sec chipping rate is maintained for transmission.

TABLE 1 depicts how a particular Walsh code is selected.

TABLE 1

|  | B1 | B2 |
|---|---|---|
| $W_1$ | 0 | 0 |
| $W_1'$ | 0 | 1 |
| $W_2$ | 1 | 0 |
| $W_2'$ | 1 | 1 |

B1 and B2 can each take on either a 0 or 1. Therefore there are 4 possible states for B1 and B2. The chart shows how these states would be used to select one of the Walsh codes/phases $W_1$, $W_1'$, $W_2$, or $W_2'$.

The transmitter 200 of FIG. 2 allows for the utilization of multiple spreading codes (Walsh codes) to transmit at a higher (say 2X) information rate without a substantial duplication of transmitter hardware. If the same were to be accomplished by the prior art transmitter of FIG. 1, the entire transmitter would have to be duplicated since block 116 only produces a single Walsh code (for example, $W_1$) at a time. The corresponding outputs 126, 132 for each transmitter "chain" are then summed for transmission. In the preferred embodiment of FIG. 2, multiple Walsh codes are utilized to accommodate a higher information rate, while only a single transmitter "chain" is required. This finds use in situations where, inter alia, a higher rate speech coder is desired, or higher rate data transmission is necessary, etc.

Figure 3:
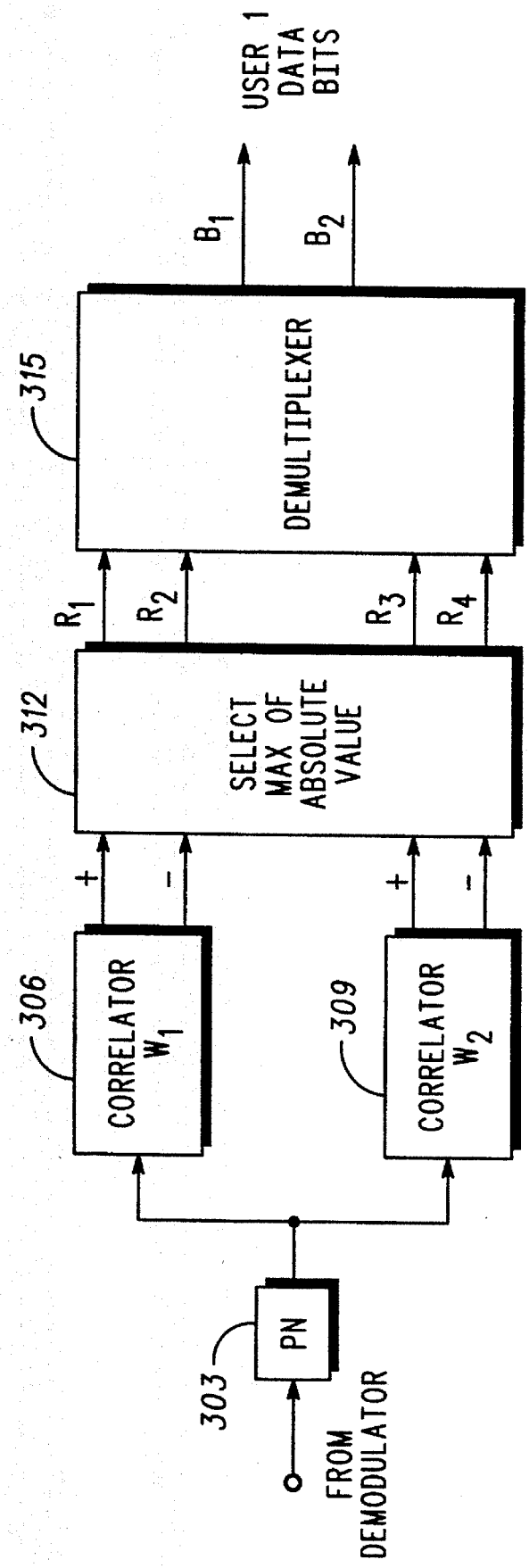
FIG. 3 generally depicts, in block diagram form, a spread spectrum receiver which receives a transmission of multiple spreading codes in accordance with the invention.

FIG. 3 depicts a receiver 300 for receiving the signal transmitted by transmitter 200 of FIG. 2. Receiver 300 does the normal PN correction of information received from a receiver demodulator (not shown) in PN block 303. Output from PN block 303 is split to feed two Walsh correlators 306, 309. Correlator 306 is utilized for $W_1$ while correlator 309 is utilized for $W_2$. A single correlator for each Walsh code is required since the transmitter 200 of FIG. 2 is utilizing two separate Walsh codes to send information of a single user (USER 1). In the prior art system of FIG. 1, only a single Walsh correlator would be used in the receiver because the polarity of its bipolar output determines which phase of the single Walsh code was transmitted.

After Walsh decorrelation by correlators 306, 309, the outputs of the two correlators 306, 309 are examined by a selector circuit 312. Selector circuit decides, through examining the analog bipolar outputs of Walsh correlators 306, 309, which Walsh code/phase was actually sent. This is done by selecting which output of correlators 306, 309 had the largest (absolute value) magnitude. This determination provides which of the two Walsh codes, $W_1$ or $W_2$, was sent. The polarity of the determined signal then determines its phase. TABLE 2 depicts a mapping of the determined Walsh code and phase which is then utilized to uniquely identify the values of the originally transmitted bits, B1 and B2. At this point, bits B1 and B2 represent the "USER 1 DATA BITS" originally input into the error correction coder 227 of transmitter 200.

TABLE 2

| Correlator Number/Polarity | Walsh Code | B1 | B2 |
|---|---|---|---|
| 306/+ | $W_1$ | 0 | 0 |
| 306/− | $W_1'$ | 0 | 1 |
| 309/+ | $W_2$ | 1 | 0 |
| 309/− | $W_2'$ | 1 | 1 |

It is understood that synchronization techniques, well known in the art, are necessary to properly implement the aforementioned technique. In particular, receiver 300 must be knowledgeable of how the double rate bits B1 and B2 are blocked by the shift register for selection of a particular Walsh code and phase. In other words, the receiver must know that Walsh code $W_1$ (for example) represents blocked bits of "00." Once determined, these bits (and others) are then further processed, and conveyed to a destination user.

In certain applications, it may be desirable to modulate the transmission of data, since the rate may be variable. One such example is when the information for transmission is generated from a variable rate speech coder. Through this reduced transmission of information, it is possible to realize system improvements due to reducing interference to other users. Also, battery consumption for a hand portable subscriber unit can be reduced by limiting transmissions in this manner. The use of appropriate minimum thresholds in the determination of the correlator output signals can be used advantageously to decide when no Walsh codes are transmitted.

The assignments of the possible B1 and B2 states to the Walsh code and phase selections can be optimized by taking into account differences in the relative decoding sensitivities. This arises due to the fact that a sensitivity difference exists between determining the presence of a particular Walsh code as compared to determining its phase. For example, TABLE 1 may be reorganized to account for decoding sensitivities to result in TABLE 3 below.

TABLE 3

|        | B1 | B2 |
|--------|----|----|
| $W_1$  | 0  | 0  |
| $W_2$  | 0  | 1  |
| $W_1'$ | 1  | 0  |
| $W_2'$ | 1  | 1  |

As one of ordinary skill in the art will appreciate, many different combinations of Walsh codes exist. TABLE 3 represents one of these combinations.

While the invention has been particularly shown and described with reference to a particular embodiment, it will be understood by those skilled in the art that various changes in form and details may be made therein without departing from the spirit and scope of the invention.

What I claim is:

1. A method of selecting one of a plurality of spreading codes with which to spread digital information in a spread spectrum transmitter, the method comprising the steps of:
   selecting a plurality of bits from the digital information to be transmitted; and
   selecting a spreading code from the plurality of spreading codes based on the plurality of bits.

2. The method of claim 1 wherein the plurality of bits includes at least two encoded bits and wherein the step of selecting the spreading code comprises the step of selecting the spreading code based on the at least two encoded bits.

3. The method of claim 1 wherein the plurality of spreading codes are orthogonal to one another.

4. The method of claim 1 wherein the plurality of spreading codes are Walsh codes.

5. A method of selecting one of a plurality of spreading codes with which to spread digital information in a spread spectrum transmitter, the method comprising the steps of:
   encoding a plurality of data bits to be transmitted to produce a plurality of encoded data bits;
   capturing a block of at least two encoded data bits of the plurality of encoded data bits; and
   selecting a spreading code from the plurality of spreading codes based on the block of at least two encoded data bits.

6. The method of claim 5 wherein the plurality of spreading codes further comprise a first portion of spreading codes and a second portion of spreading codes comprised of phase reversals of the first portion of spreading codes.

7. The method of claim 5 wherein the spreading code is modulated prior to transmission.

8. The method of claim 7 wherein the modulation further comprises phase modulation.

9. The method of claim 5 wherein the plurality of spreading codes are orthogonal to one another.

10. The method of claim 5 wherein the plurality of spreading codes are Walsh codes.

11. The method of claim 5 wherein the plurality of spreading codes are further modified by a separate PN code generator.

12. A spread spectrum transmitter comprising:
    means for selecting a plurality of data bits from digital information to be transmitted;
    means, coupled to the means for selecting the plurality of data bits, for capturing a block of at least two data bits of the plurality of data bits; and
    means, coupled to the means for capturing, for selecting a spreading code from a plurality of spreading codes based on the block of at least two data bits.

13. The spread spectrum transmitter of claim 12 wherein the means for selecting a plurality of data bits further comprises means for encoding the plurality of data bits.

14. The spread spectrum transmitter of claim 13 wherein the means for encoding the plurality of data bits comprises an error correction encoder.

15. The spread spectrum transmitter of claim 12 wherein the plurality of spreading codes comprise a plurality of orthogonal spreading codes.

16. The spread spectrum transmitter of claim 15 wherein the plurality of spreading codes comprise a plurality of Walsh spreading codes.

17. The spread spectrum transmitter of claim 12 wherein the plurality of spreading codes are further modified by a separate PN code generator.

18. A spread spectrum transmitter comprising:
    means for selecting a plurality of bits from digital information to be transmitted; and
    means, coupled to the means for selecting the plurality of bits, for selecting a spreading code from a plurality of spreading codes based on the plurality of bits.

19. The spread spectrum transmitter of claim 18 wherein the plurality of spreading codes are orthogonal to one another.

20. The spread spectrum transmitter of claim 18 wherein the plurality of spreading codes are Walsh codes.

21. The spread spectrum transmitter of claim 18 further comprising means for encoding at least two bits of the plurality of bits to produce at least two encoded bits.

22. The spread spectrum transmitter of claim 21 wherein the means for selecting the spreading code comprises means for selecting the spreading code based on the at least two encoded bits.

23. A spread spectrum transmitter comprising:
    an encoder for encoding a plurality of bits to be transmitted;
    a shift register, coupled to the encoder, for selecting at least two bits of the plurality of bits; and
    a multiplexer, coupled to the shift register, for selecting a spreading code from a plurality of spreading codes based on the at least two bits.

24. A spread spectrum receiver comprising:
    first means for correlating a first spreading code of a plurality of spreading codes with a received spread spectrum signal that includes a plurality of transmitted bits to produce a first correlated signal;
    second means for correlating a second spreading code of the plurality of spreading codes with the received spread spectrum signal to produce a second correlated signal;
    means, coupled to the first means for correlating and the second means for correlating, for determining a magnitude of the first correlated signal and a magnitude of the second correlated signal;
    means, coupled to the means for determining, for selecting the first spreading code when the magnitude of the first correlated signal exceeds the magnitude of the second correlated signal and for selecting the second spreading code when the magnitude of the second correlated signal exceeds the magnitude of the first correlated signal to produce a selected spreading code;
    means, coupled to the means for selecting, for identifying the plurality of transmitted bits based on the selected spreading code.

25. A method for selecting a spreading code from a plurality of spreading codes with which to identify a plurality of transmitted bits contained in a received spread spectrum signal, the method comprising the steps of:

correlating the received spread spectrum signal with a first spreading code of the plurality of spreading codes to produce a first correlated signal;

correlating the received spread spectrum signal with a second spreading code of the plurality of spreading codes to produce a second correlated signal;

determining a magnitude of the first correlated signal and a magnitude of the second correlated signal; and selecting either the first spreading code or the second spreading code based on the magnitude of the first correlated signal and the magnitude of the second correlated signal.

26. The method of claim 25, wherein the step of selecting further comprises the step of selecting the first spreading code when the magnitude of the first correlated signal exceeds the magnitude of the second correlated signal and selecting the second spreading code when the magnitude of the second correlated signal exceeds the magnitude of the first correlated signal.

* * * * *

UNITED STATES PATENT AND TRADEMARK OFFICE
CERTIFICATE OF CORRECTION

PATENT NO. : 5,515,396
DATED : May 7, 1996
INVENTOR(S) : Kotzin, Michael D.

It is certified that error appears in the above-indentified patent and that said Letters Patent is hereby corrected as shown below:

On the Title page, item [75];

Inventor Name reads "Michael Dalekotzin" should be --Michael D. Kotzin--.

Signed and Sealed this

Sixth Day of August, 1996

Attest:

BRUCE LEHMAN

*Attesting Officer*    *Commissioner of Patents and Trademarks*